United States Patent
Nakamura

[11] Patent Number: 5,816,913
[45] Date of Patent: Oct. 6, 1998

[54] METHOD AND APPARATUS FOR MEASURING VIRTUAL TIME DIFFERENCE OR VIRTUAL DISTANCE BETWEEN MOBILE BODIES, AND STORAGE MEDIUM STORING PROGRAMS FOR CAUSING A COMPUTER TO EXECUTE THE METHOD

[75] Inventor: Atsuhiko Nakamura, Tokyo, Japan

[73] Assignee: Sega Enterprises, Ltd., Tokyo, Japan

[21] Appl. No.: 723,837

[22] Filed: Sep. 30, 1996

[30] Foreign Application Priority Data

Oct. 2, 1995 [JP] Japan ................................. 7-255230

[51] Int. Cl.$^6$ ............................................. A63F 9/14
[52] U.S. Cl. ............................................................. 463/6
[58] Field of Search ........................... 463/6, 7; 273/442; 340/988, 989, 991, 992, 993, 323 R; 364/410; 701/300, 301, 302

[56] References Cited

U.S. PATENT DOCUMENTS

4,449,114  5/1984  Fascenda et al. ........................ 340/988
5,435,553  7/1995  Arima et al. .................................. 463/6

*Primary Examiner*—George Manuel
*Attorney, Agent, or Firm*—Dickstein Shapiro Morin & Oshinsky L.L.P.

[57] ABSTRACT

The present invention relates to a method, apparatus and computer readable medium for a race game. The method comprising the steps of: computing positions of first and second mobile bodies on a course defined within a predetermined coordinate space every predetermined sampling time; detecting whether the first or second mobile body, whichever is leading, passes a predetermined point on the course from computed positional information of the first and second mobile bodies on the course; detecting whether the following mobile body does not pass the predetermined point within a predetermined set time after the leading mobile body has passed the predetermined point, from the computed positional information; and indicating game over on a display when it is detected that the following mobile body does not pass the predetermined point within the set time. Also, the method relates to measure whether the distance between mobile modies exceeds a set value or not.

8 Claims, 8 Drawing Sheets

METHOD AND APPARATUS FOR MEASURING VIRTUAL TIME DIFFERENCE OR VIRTUAL DISTANCE BETWEEN MOBILE BODIES, AND STORAGE MEDIUM STORING PROGRAMS FOR CAUSING A COMPUTER TO EXECUTE THE METHOD

BACKGROUND OF THE INVENTION

1. Field of the Invention

The present invention relates to a method and apparatus for measuring the virtual time difference or virtual distance between mobile bodies using. A computer system, and, more particularly, to a method which measures the virtual time difference or virtual distance between mobile bodies and which sets a game over when a time difference equal to or greater than a predetermined time difference or a distance equal to or greater than a predetermined distance is detected in a race of mobile bodies like cars by a plurality of players, and a measuring apparatus for executing this method.

2. Description of the Related Art

Conventionally, various kinds of game machines for car races which use a computer system have been developed and put to a practical use for arcade games, home usage and the like.

With regard to car racing apparatuses, game playing methods are developed with reference to actual car races, so that the start point and the goal point of each race are previously settled. Most games are designed in such a way that each player performs predetermined manipulations on a selected car in each race from the start point to the goal point and competes the time and the finishing position until the car crosses the goal. For a car race where cars compete one another in a racing course for instance, how many laps the cars should make along the course is determined before a game starts. Even for a car rally, a predetermined course from the start point to the last goal point is determined before the game starts.

For arcade game machines, particularly, the time required for a game can be set to a relatively constant length by making the game start when a player deposits a predetermined amount of money and making the game over when the goal in a fixed course is reached. This design is effective for arcade games in which a plurality of players may share each game machine in that the unit price for the game machine can be predicted and a profit can be made.

When one wants to design a game machine for car races by using a computer system, simply replaying the actual car races limits the kinds of games and does not fascinate players so much. Home game devices are designed in such a way that the time needed for a game can be determined in a relatively flexible manner and thus provide more flexible playing methods than the aforementioned arcade game machines for business use. The home game devices can therefore employ playing methods with higher entertainment without being restricted to the conventional car racing methods.

For example, some methods may be designed for long races which demand the player's endurance. If the distance of the course is simply elongated as in the conventional methods, however, the last half of each race is likely to be draggy or tired to the player. In this case, therefore, it is necessary to keep making the player feel tense somehow and the game needs to be over at the proper timing.

In the case where a plurality of players compete against one another in a car race and there are significant differences in the performances of the players, if the game does not end until the cars run the entire course with a predetermined distance or length as in the prior art, the players should simply continue draggy car manipulations throughout the second half of the race. If the player who shows a skillful manipulation in the game is handicapped over the opponents in this case, the player can enjoy tenser feeling in the game. The same is true of the case where a player competes against a computer-controlled car.

SUMMARY OF THE INVENTION

Accordingly, it is a primary object of the present invention to provide a method and apparatus for measuring the virtual time difference or virtual distance between mobile bodies, which are employed in a game method and game machine that allow players to play races differently from the conventional and ordinary car racing method and machine, and a storage medium having storing a program for causing a computer to execute the method.

It is another object of this invention to provide a method and apparatus for measuring the virtual time difference between mobile bodies, which end a game when the time difference between the competing mobile bodies becomes equal to or greater than a predetermined set time unlike in the conventional method which makes a game over when the player runs over a given distance or finishes the course, and a storage medium having storing a program for causing a computer to execute the method.

It is a further object of this invention to provide a method and apparatus for measuring the virtual distance between mobile bodies, which end a game when the distance between the competing mobile bodies becomes equal to or greater than a predetermined set distance unlike in the conventional method which makes a game over when the player runs over a given distance or finishes the course, and a storage medium having storing a program for causing a computer to execute the method.

To achieve the above objects, according to the first aspect of this invention, there is provided a method of measuring a virtual time difference between mobile bodies in a racing game method which is performed by using a storage medium storing a racing game program, a game console for performing the racing game program, a display section for displaying game scenes based on image or video signals from the game console and an input operation section for allowing a player to perform input operations for at least acceleration, braking and manipulation of a steering wheel to the game console in association with the game scenes, the method comprising the steps of:

computing positions of first and second mobile bodies on a course defined within a predetermined coordinate space every predetermined sampling time;

detecting whether the first or second mobile body, whichever is leading, passes a predetermined point on the course from computed positional information of the first and second mobile bodies on the course;

detecting whether the following mobile body does not pass the predetermined point within a predetermined set time after the leading mobile body has passed the predetermined point, from the computed positional information; and indicating game over on a screen of the display section when it is detected that the following mobile body does not pass the predetermined point within the set time.

To achieve the above objects, according to the second aspect of this invention, there is provided a method of measuring a virtual distance between mobile bodies in a racing game which is played by using a storage medium storing a racing game program, a game console for performing the racing game program, a display section for displaying game scenes based on image or video signals from the game player main body and an input operation section for allowing a player to perform input operations for at least acceleration, braking and manipulation of a steering wheel to the game console in association with the game scenes, the method comprising the steps of:

computing positions of first and second mobile bodies on a course defined within a predetermined coordinate space every predetermined sampling time;

computing a distance between the first and second mobile bodies on the course from computed positional information of the first and second mobile bodies on the course;

detecting whether the distance between the first and second mobile bodies on the course is equal to or greater than a predetermined set distance; and indicating game over on a screen of the display section when it is detected that the computed distance becomes equal to or greater than the predetermined set distance.

According to the first or second aspect of this invention, the measuring method may further comprise a step of counting a time passed since reception of a game start signal and indicating game over on the screen when the counted time passes a predetermined set time.

To achieve the above objects, according to the third aspect of this invention, there is provided an apparatus for measuring a virtual time difference between mobile bodies for use in a game machine for performing a racing game program stored in a storage medium in accordance with a manipulation signal given by a player and supplying image or video signals to a display section for displaying game scenes, the measuring apparatus comprising:

computation means for computing positions of first and second mobile bodies on a course defined within a predetermined coordinate space every predetermined sampling time;

first detection means for detecting whether the first or second mobile body, whichever is leading, passes a predetermined point on the course from computed positional information of the first and second mobile bodies on the course;

second detection means for detecting whether the following mobile body does not pass the predetermined point within a predetermined set time after the leading mobile body has passed the predetermined point, from the computed positional information; and control means for supplying image signals to the display section for indicating game over on a screen of the display section when it is detected that the following mobile body does not pass the predetermined point within the set time.

To achieve the above objects, according to the fourth aspect of this invention, there is provided an apparatus for measuring a virtual distance between mobile bodies for use in a game machine for performing a racing game program stored in a storage medium in accordance with a manipulation signal given by a player and supplying image signals to a display section for displaying game scenes, the measuring apparatus comprising:

first computation means for computing positions of first and second mobile bodies on a course defined within a predetermined coordinate space every predetermined sampling time;

second computation means for computing a distance between the first and second mobile bodies on the course from computed positional information of the first and second mobile bodies on the course;

detection means for detecting whether the distance between the first and second mobile bodies on the course is equal to or greater than a predetermined set distance; and control means for supplying image signals to the display section for indicating game over on a screen of the display section when it is detected that the computed distance becomes equal to or greater than the predetermined set distance.

According to the third or fourth aspect of this invention, the control means may further comprise means for counting a time passed since reception of a game start signal and indicating game over on the screen when the counted time passes a predetermined set time.

According to this invention, the virtual time difference or the virtual distance between the leading mobile body and following mobile body can be measured so that a game can be terminated when the leading mobile body leads the following mobile body by at least a predetermined time or at least a predetermined distance. This design can terminate a game without causing the mobile bodies to finish the entire course. Each player should therefore seriously manipulate the associated mobile body from the beginning of a game, and would enjoy the game better.

Further, the time to the end of a game can be made longer or shorter by altering the set time or the set distance, and players may be given handicaps according to the differences in their skills.

According to this invention, the position of a mobile body is computed every predetermined sampling time, and various determinations are made in accordance with the acquired positional information. In displaying game scenes on a display device, the game scene are to be drawn on the display device at a given period, the time needed for the computation can be secured by setting the sampling time in synchronism with the given period. The sampling period may of course be an integer multiple of the period that is needed to draw the game screnes on the display device.

DETAILED DESCRIPTION OF THE PREFERRED EMBODIMENT

A preferred embodiment of the present invention will now be described with reference to the accompanying drawings.

Figure 1:
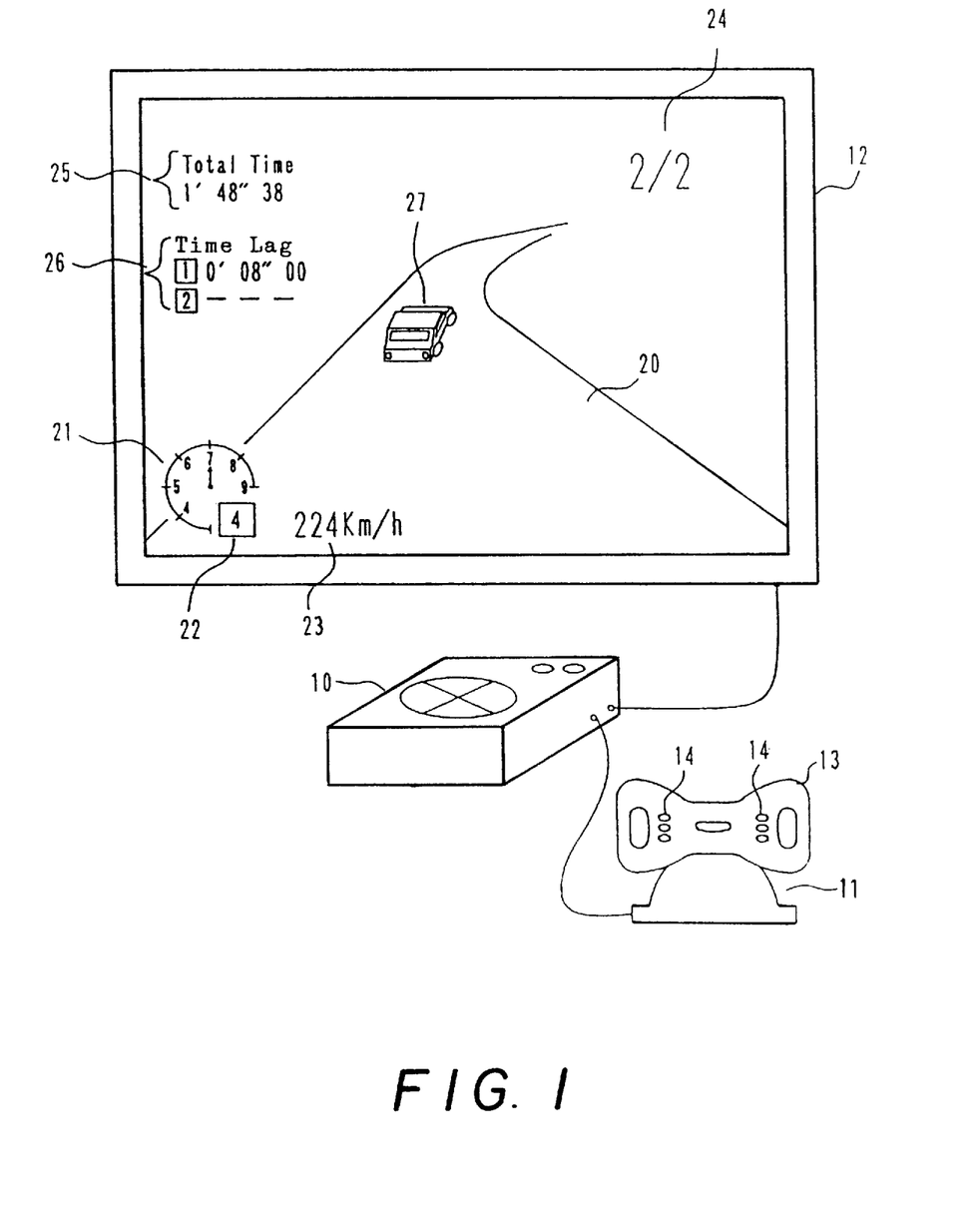
FIG. 1 is a diagram exemplifying the structure of a game machine according to one embodiment of this invention and exemplifying a screen.

FIG. 1 illustrates the basic structure of a playing machine and an example of a basic display image. The basic structure comprises a game console 10 into which a game cartridge or a compact disk having stored game software is loaded, an input operation section 11, which is connected to the main body 10 via a cable or radio, for inputting operations information on the acceleration, steering direction, braking, transmission, etc., and a display device 12 for displaying an image which is processed by the console 10.

The operation section 11 has a section 13 shaped like a steering wheel and various buttons 14. Turning the steering wheel right or left inputs the steering direction, and depressing the buttons 14 inputs the operational information of the acceleration, braking and transmission.

The console 10 has a structure similar to that of a computer system which is used for ordinary games, and incorporates a CPU or the like, which loads a program in, for example, a game cartridge or a compact disk and runs it.

According to this embodiment, as illustrated, a display image basically comprises the scene which is seen through the front glass when a player gets on a racing car and information necessary for a race. As illustrated, the display image has a course 20 at the center of the screen extending from the foreground, and has a tachometer 21, a display 22 showing the current gear number of the transmission and a display 23 showing display image further includes a position information display 24 on the upper right corner, which shows the number of cars in the race at the denominator and the position of the player's car at the numerator.

Shows on the upper left corner of the screen are total time display 25 indicating the passing time of a game and a display 26 indicating the delay time from the top car. A display 27 shows the top or leading car which disappears from the scene if the distance or time difference from the leading car becomes large.

Structure of Playing Machine

Figure 2:
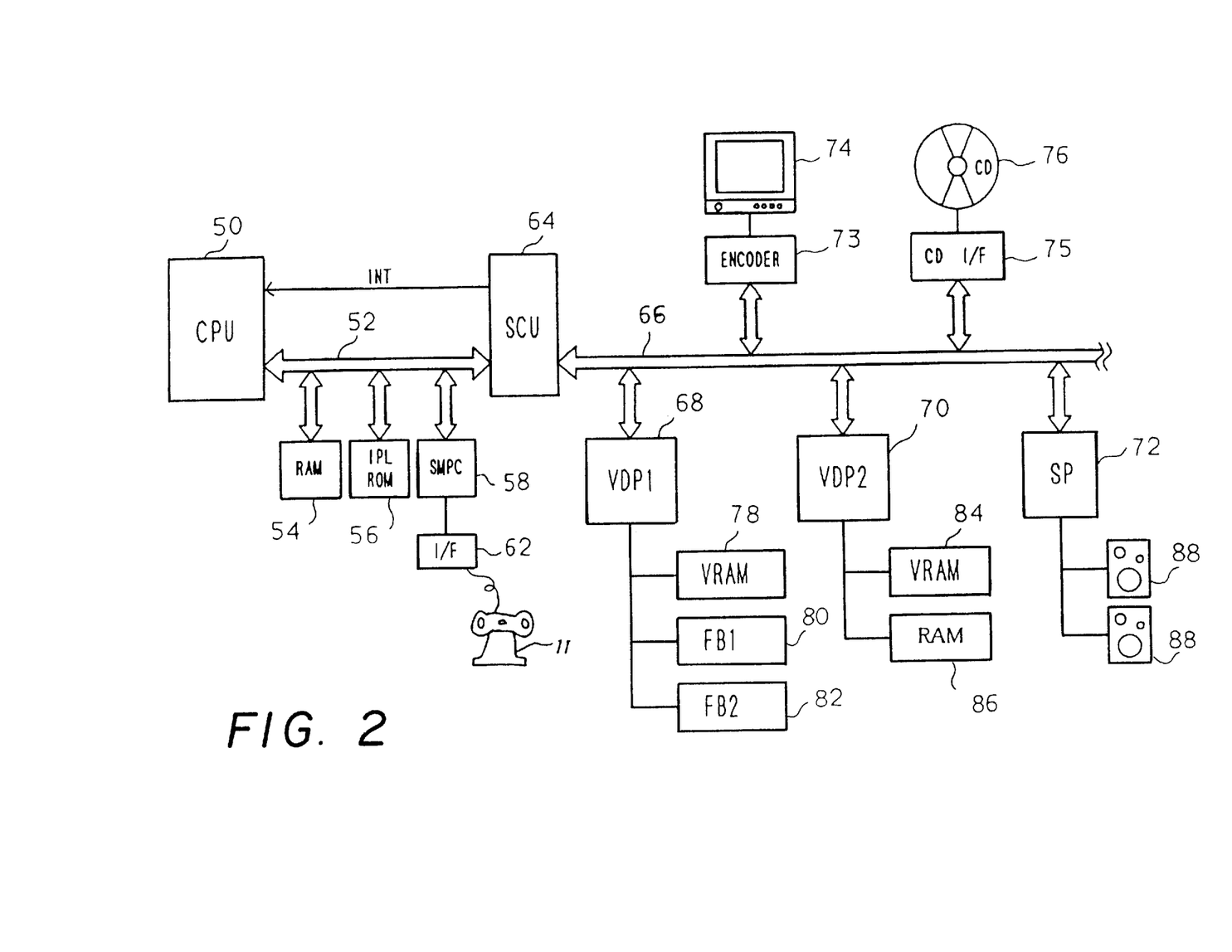
FIG. 2 is a block diagram of the game machine according to this embodiment of the invention.

FIG. 2 is a block diagram for explaining an example of the basic structure of the console 10. The console 10 has the following schematic structure.

In FIG. 2, a main CPU 50 performs processing of a game and arithmetic operations for image processing or the like in accordance with a game program. The main CPU 50 is connected to a random access memory (RAM) 54 and a read only memory (ROM) 56. The RAM 54 provides a work memory area during arithmetic operations, and stores data acquired by arithmetic operations, and a game program and image data of a course, a car and background externally supplied. The ROM 56 stores a program (IPL) for executing initial program loading. Also connected to the CPU 52 is a system manager and peripheral controller 58, which controls the reset management of the entire system and the interface with an external device, such as the input operation section 11. Reference numeral "62" is an interface circuit.

A system control unit (SCU) 64 serves as a coprocessor of the CPU 50 and controls individual buses 52 and 66. The SCU 64 incorporates a direct memory access (DMA) controller which transfer display data to a video memory (VRAM) 78 during the operation of the main CPU 50.

A first video display processor (VDP1) 68, a second video display processor (VDP2) 70, a speech processor 72, a display device 74, and a CDROM (Compact Disk ROM) 76 are connected to the SCU 64 by the bus 66. Reference numeral "73" is an encoder, and reference numeral "75" is an interface for the CDROM.

The first video display processor 68 executes control of image data of parts, such as the course, car, background and game information. Connected to this processor 68 are the video memory 78 in which a command for image processing and character data originated from the image processing are written by the main CPU 50, and two frame buffers 80 and 82 which store display data to be displayed pixel by pixel. The second video display processor 70 performs control in such a way as to display data, written in the frame buffers 80 and 82, on the display device 12 in accordance with a predetermined priority. A video memory 84 and a color RAM 86 for storing color information are connected to this processor 70.

When the CDROM 75 having stored a program and image data of parts associated with a car racing game according to this invention is installed into the console 10 having the above-described structure, those stored data are loaded into the memory 54 as needed as the game progresses. The program and image data of parts associated with the car racing game may be stored in other storage media such as a semiconductor memory, a magnetic recording medium and a magneto-optical recording medium, which are properly selected by a person skilled in the art.

The console 10 executes various kinds of operation controls in synchronism with a system clock of a cycle of 1/60 sec, writes display data into the frame buffers 80 and 82 at a cycle of 1/30 sec which is a half the cycle of the system clock, and draws data in the frame buffers 80 and 82 on the display device 12 once every 1/60 sec. In this example, the same display data written in the frame buffers 80 and 82 are drawn twice on the display device 12.

Flow of Game

Figure 3:
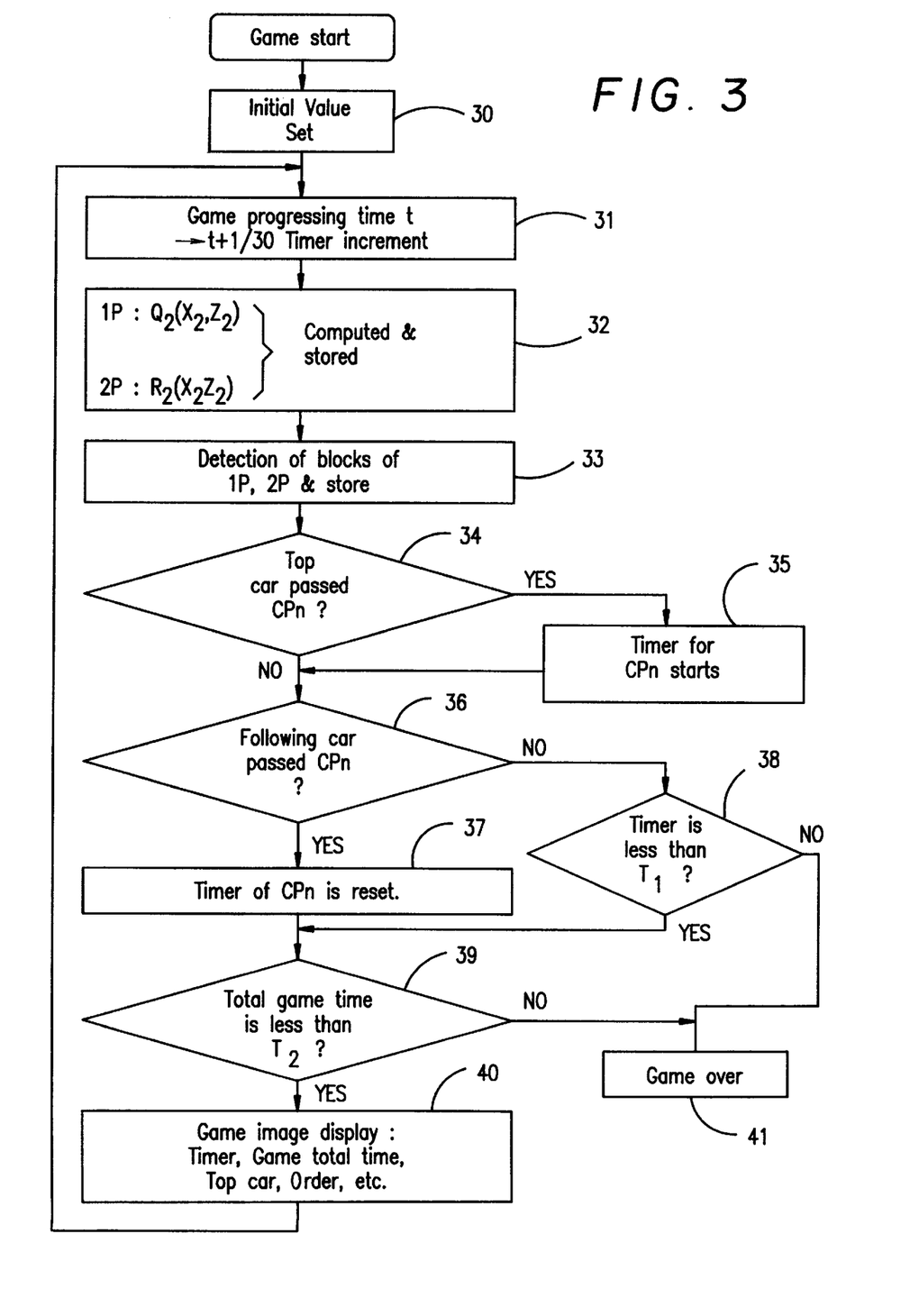
FIG. 3 is a flowchart illustrating the action of a game.

FIG. 3 presents an operational flowchart for explaining the general operation of the car racing game. The car race according to this embodiment is basically designed such that the positions of the top car and the following car are computed from time to time and when the following car cannot pass a given check point (CP) within a predetermined set time T1 after the top car has passed that check point, the game is over. When a predetermined set total game time T2 passes, the game is over too. When a plurality of players play the game, therefore, the condition for terminating the game is whether or not the top car leads the following car by a time equal to or greater than the set time T1 while the set total game time T2 passes. When a single player plays the game, the opponent is an imaginary car which is controlled in accordance with the program in the console 10 and the condition for terminating the game is the same as that of the previous case.

The flow of the game will now be discussed mainly with reference to FIG. 3 and with reference to FIGS. 4, 5 and 6 as needed.

At the time the game starts, various initial values are set. For instance, the most important initial values for this game are the time difference T1 between the top car and the following car and the total game time T2. Those values are set arbitrarily by a player. What is necessary for the game to progress includes resetting of the timer which measures the time between cars at each check point and resetting of the timer which measures the time passed in the game (total game progressing time).

The game progresses with a clock of 1/30 sec which is acquired by frequency-dividing the system clock of 1/60 sec by two. While drawing is performed 60 times per second under the normal image display control, a display image for the game in this embodiment consists of 30 frames per second. Therefore, each frame is drawn twice so that a total of 30 frames are displayed per second. Accordingly, various arithmetic operations are also executed every 1/30 sec. Sampling for the positional information of the cars is thus performed every 1/30 sec.

Returning to FIG. 3, when the initial values are set or reset (step 30), 1/30 sec is added to a game progressing time t first (step 31). This game progressing time t is stored, for example, in a predetermined address area in the work area in the RAM 54 in the console 10. When the timer associated with each check point has already been activated, the time in the activated timer is incremented by 1/30 sec.

Assuming that two players play the game, then the position Q2 (x2, z2) of the car of the first player 1P and the position R2 (x2, z2) of the car of the second player 2P are computed by the CPU 50 and are stored in the predetermined address area in the work area in the RAM 54 (step 32).

Then, the CPU 50 performs an arithmetic operation to detect to which blocks in the course those computed positions Q2 (x2, z2) and R2 (x2, z2) belong and store the blocks in the work area in the RAM 54 (step 33).

The arithmetic operations in the steps 32 and 33 will be discussed specifically referring to FIGS. 4 and 5. In this case, a course 20 used in the car race is defined as, for example, 128 blocks B1, B2, ..., and B128 in the absolute coordinate (X, Y, Z) system as illustrated in FIG. 4. As the Y axis is perpendicular to the sheet surface of FIG. 4, however, it is omitted in the following description for the sake of simplicity.

Figure 4:
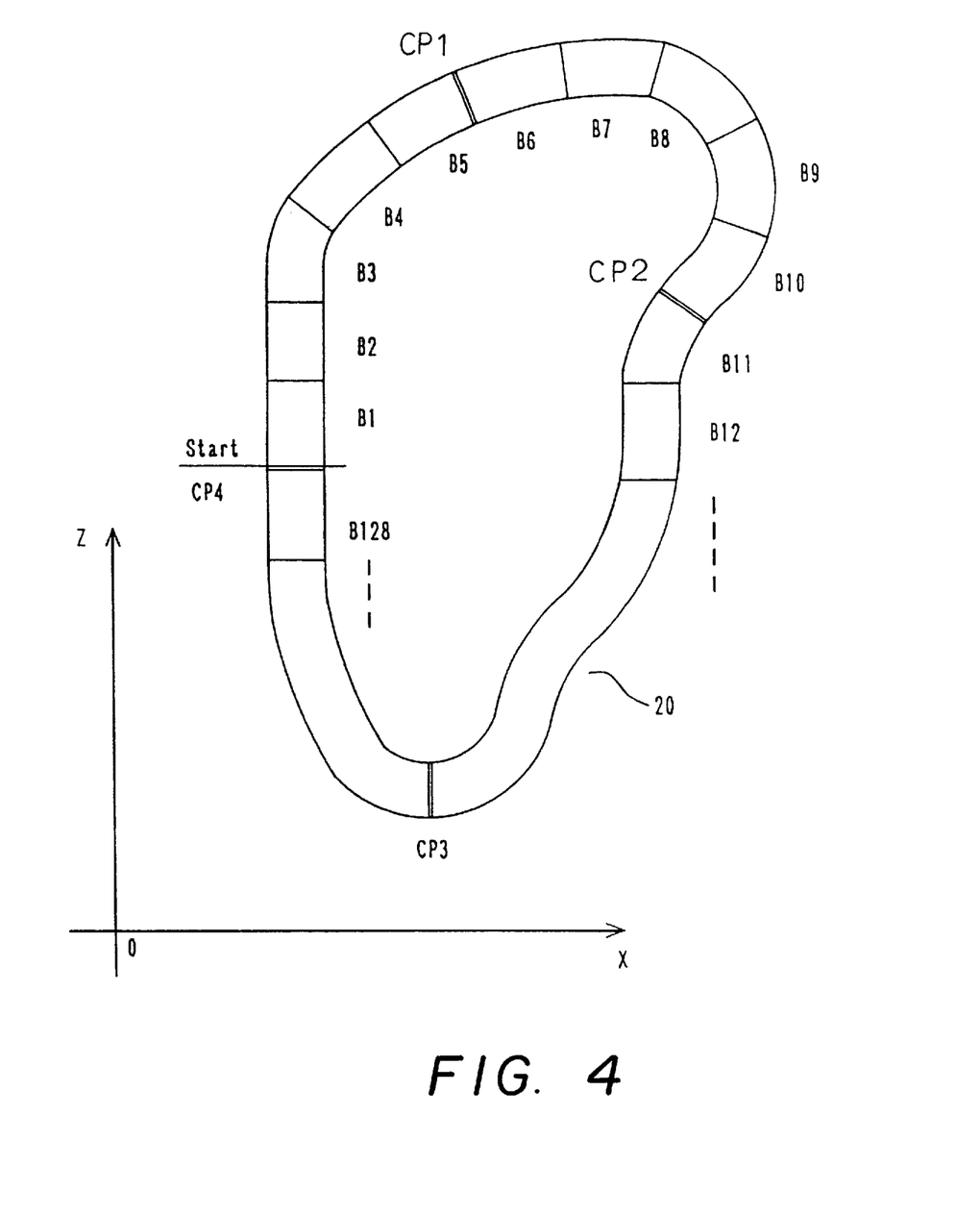
FIG. 4 is a diagram for explaining the action of the game.

The course 20 shown in FIG. 4 for one lap from the start point is divided to 128 blocks. And four check point CP (CP1, CP2, CP3 and CP4) are provided on the course 20 to measure the time difference between the competing cars. The number of the check points CP can be set arbitrarily. For example, one check point CP may be set for each block.

Figure 5:
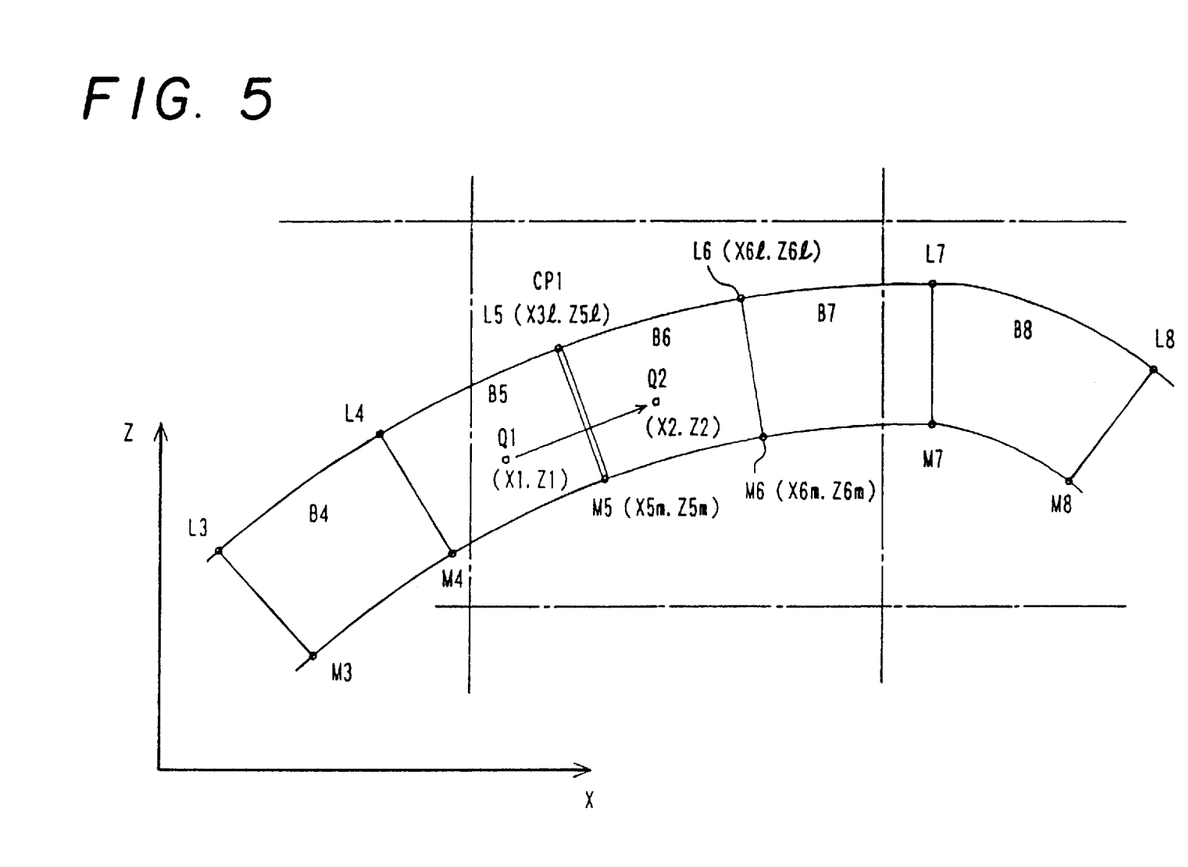
FIG. 5 is a diagram for explaining the action of the game.

FIG. 5 specifically illustrates how to define the individual blocks of the course 20. The block B6, picked up as a representing example, is defined by data of the coordinates (x51, z51), (x61, z61), (x5m, z5m) and (x6m, z6m) of four points L5, L6, M5 and M6 which forms the block B6. Therefore, data of those coordinates are stored as the information of the course 20 in the CDROM 76 for the game where the game program and associated data are stored. That is, the coordinate data of L1 to L128 and M1 to M128 are stored for the entire course 20.

A description will now be given of the arithmetic operation for acquiring the positions of the competing car. As mentioned above, this arithmetic operation is performed once every 1/30 sec. In this case, the current positional coordinates Q2 (x2, z2) are obtained from the positional coordinates Q1 (x1, z1) of 1/30 sec earlier. Specifically, the current positional coordinates Q2 (x2, z2) are obtained by adding the amount of movement ($\Delta x$, $\Delta z$) according to the operational information input through the input operation section 11 during the last 1/30 sec to the coordinates Q1 (x1, z1).

The amount of movement ($\Delta x$, $\Delta z$) is acquired by computation from the speed, which is obtained from the acceleration, braking, the transmission gears, etc., and the direction of the steering 13. The computation is performed by the CPU 50, and data of the previous positional coordinates Q1 (x1, z1), data of the amount of movement ($\Delta x$, $\Delta z$) and data of the current positional coordinates Q2 (x2, z2) are stored at the predetermined address area in the work area in the RAM 54. In acquiring the current positional coordinates Q2 by adding the amount of movement to the previous positional coordinates Q1, the arithmetic operation is performed in such a way as to inhibit the movement of each car going out of the course 20. Specifically, the course may be defined by three-dimensional coordinates in such a way that walls are present on both sides of the course 20 to inhibit cars from crossing the course 20.

When the positional coordinates Q2 of each competing car are acquired, computation is performed to detect to which block of the course 20 the positional coordinates Q2 belong. This computation is important to determine where on the course 20 each competing car is located and if the car has passed a predetermined check point CP.

According to a very simple computing method, because the current positional coordinates Q2 are shifted forward or backward from the block B5 to which the positional coordinates Q1 of the competing car of 1/30 sec earlier belong, an arithmetic operation should be performed to detect if the current positional coordinates Q2 (x2, z2) are located within the four points L4, L5, M4 and M5 which forms the block B5, if not located, another arithmetic operation should be performed to detect if the current positional coordinates Q2 (x2, z2) are located within the four points L5, L6, M5 and M6 which forms the adjacent block B6, and so forth.

If cars can move a plurality of blocks in 1/30 sec, however, the arithmetic operations in this computing method may take time. In this case, for example, the computation can be carried out efficiently by defining arbitrary large square areas as on a chess board and storing course information indicating which blocks belong to each square area in advance in the memory. In other words, to which square area the current positional coordinates Q2 (x2, z2) belong is computed quickly, and then to which couple of blocks of the course the current positional coordinates Q2 (x2, z2) belong is obtained by the aforementioned arithmetic operation to check if the current positional coordinates Q2 (x2, z2) are located in the coordinate area defined by four points.

The optimal method of executing the above computation is easily conceivable as needed by those persons skilled in the art based on specific parameters of the game, such as the definition of the course and the speeds of the competing cars.

Returning to FIG. 3 again, when the current positional coordinates and the block to which the current positional coordinates belong are computed and stored in the RAM 54, it is then determined if the top car has passed a check point CP on the course (step 34). This is accomplished by performing an arithmetic operation to detect if the new block to which the current positional coordinates belong is the block of the check point CP. In the example in FIG. 5, as the belonging block is changed to B6 from B5, it is detected that the top car has passed the check point CP1.

When it is detected that the top car has passed the check point CP1, the timer associated with the check point CP1 starts measuring the time (step 35). Specifically, this time measurement can be accomplished by providing a timer area in a predetermined address area in the work area in the RAM 54 and incrementing the time of the timer by every 1/30 sec in step 31.

Then, computation for checking if the following car has passed the check point CP1 is performed in the same way as done for the top car (step 36). When the following car has not passed the check point CP1 yet, an arithmetic operation is performed to detect if the time of the associated timer is less than the time T1 set at the beginning of the game (step 38). This arithmetic operation is also performed by the CPU 50. When the time of the associated timer is equal to greater than the time T1, which means that there is a time difference of T1 or greater between the top car and the following car, the game therefore becomes over at that point of time (step 41).

When the following car has passed the check point CP1, the time of the timer associated with the check point CP1 is reset in step 37. Specifically, the value in the associated memory area is changed to zero.

When the following car has passed the check point CP1 or when the following car has not passed the check point CP1 yet but the time of the timer is less than T1, an arithmetic operation is performed to check if the total game time is less than the initially set T2 (step 39). When the total game time has already passed T2, the game is over.

When the total game time has not passed T2 yet, the game should continue and the game image is displayed according to the current state. Specifically, the parts as shown in FIG. 1 are written in the frame buffers 80 and 82 as pixel-by-pixel image information by the first video display processor 68, and are displayed on the display device 12 by the second video display processor 70. The image information to be displayed on the display device 12, which are important on the progression of the game, are the total game time display 25, the position display 24 and the display 26 which shows the passage of the time after the top car has passed the check point CP. The display 26 shows the passage of the time after the top car has passed the check point CP when the player is manipulating the following car, and it shows the passage of the time after the player's car has passed the check point CP when the player is manipulating the top car. When the following car passes the check point CP within the set time, the display 26 is cleared.

Thereafter, the above-described operation flow (steps 31 to 40) is repeated in the next game period (1/30 sec).

Figure 6:
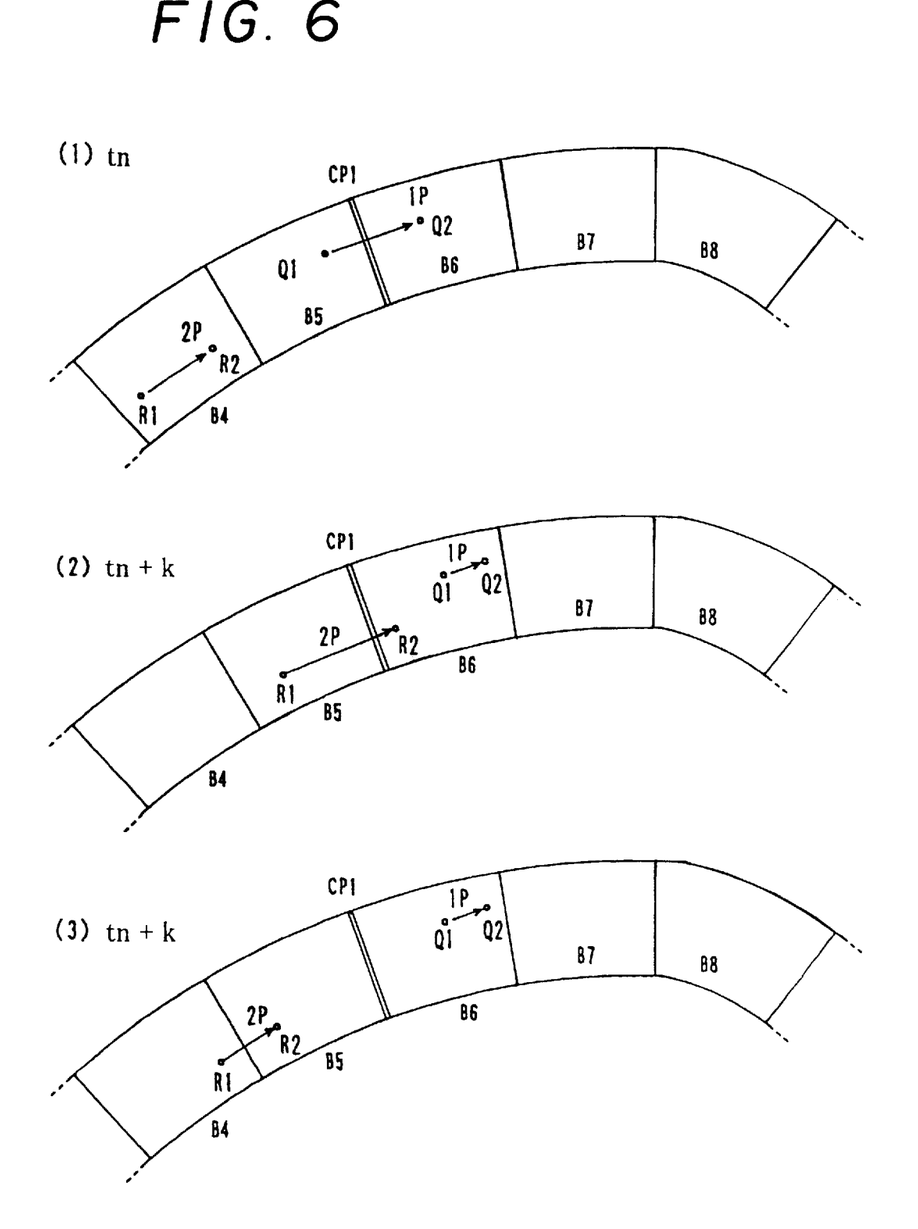
FIG. 6 is a diagram for explaining the action of the game.

Referring to FIG. 6, a specific description will be given below of how the timer associated with the check point CP starts measuring the time after the top car passes the check point CP and how to detect if the following car passes the check point CP in the case where two players are racing in their two cars.

Part (1) in FIG. 6 exemplifies the shifts of the positions of the top car 1P and the following car 2P at time tn. Parts (2) and (3) in FIG. 6 exemplify different shifts of the positions of the top car 1P and the following car 2P at time tn+k which is after the passage of the set time T1 from time tn. When the top car 1P passes the check point CP1 at time tn, the associated timer starts measuring the time. When the following car 2P moves to R2 from R1 at time tn+k and crosses the check point CP1 as shown in (2) in FIG. 6, the timer is reset in step 37 in the flowchart in FIG. 3 and the game is resumed. When the following car 2P is still located in the block B5 at time tn+k as shown in (3) in FIG. 6, the decision in step 36 in the flowchart in FIG. 3 is negative (NO) and the decision in step 38 is also negative (NO), so that the game is over.

In either case, when time tn+k is greater than the total time T2 which has been set at the beginning of the game, the decision in step 39 is negative (NO) and the game is over.

Flow of Another Game

Figure 7:
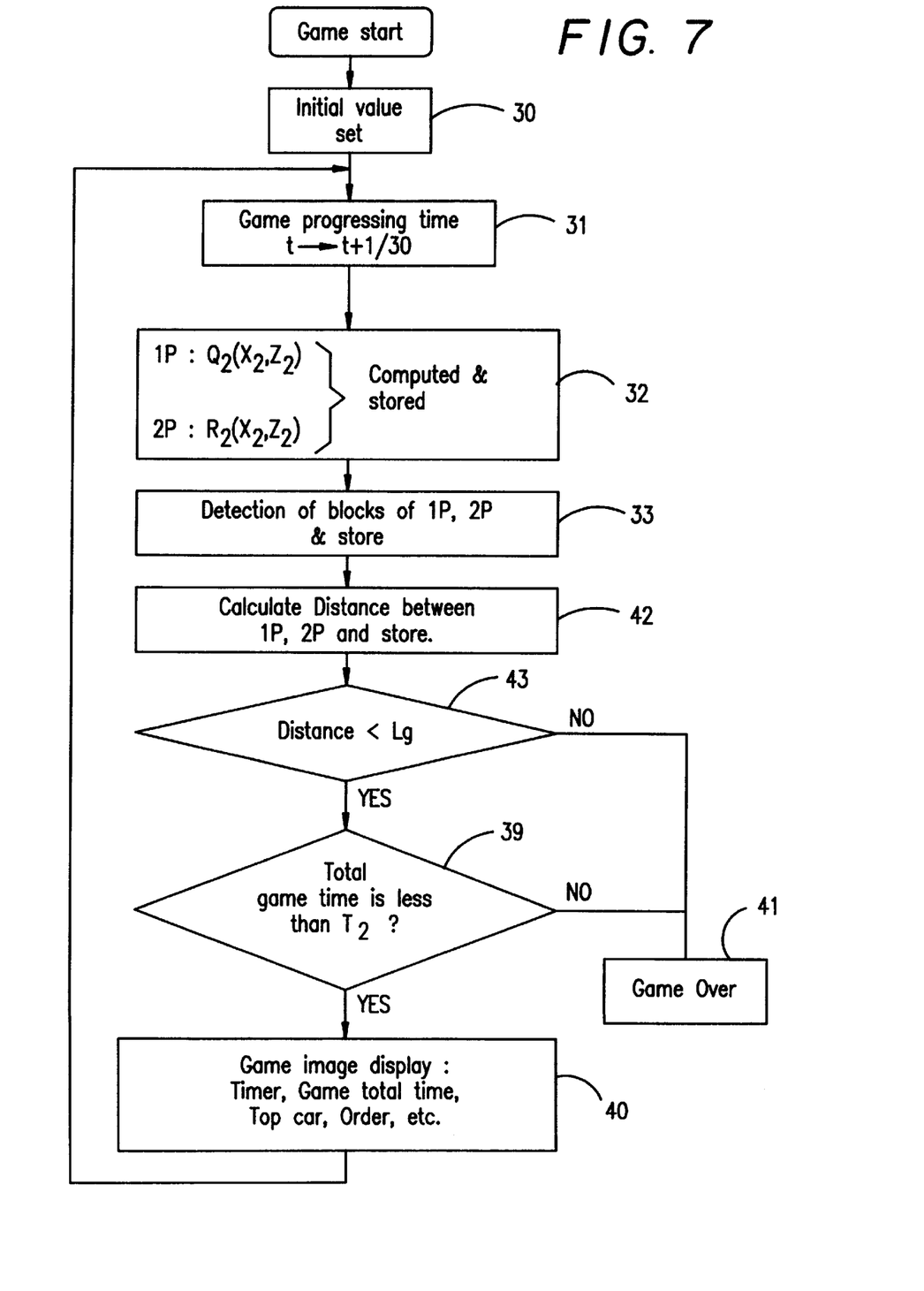
FIG. 7 is a diagram for explaining the action of another game.

According to the flowchart of the game in FIG. 3, the game is over when the time from the point when the top car has passed the check point to the point when the following car passes the same check point exceeds the set time T1. As an alternative, the game may be designed to be over when the distance between the top car and the following car, not the time difference between those cars, exceeds a preset distance Lg. FIG. 7 illustrates the flowchart for the game in such a case. Same step numbers are given to those steps in FIG. 7 which are the same as the corresponding steps in FIG. 3.

The processes from step 30 where the initial values are set after the game starts to step 33 for detecting the blocks in which the top car and the following car (1P and 2P) are located are the same as that in FIG. 3, with the only difference lying in that the distance Lg, not the time T1, which is used for the determination of game over is set as one initial value.

In step 42, an arithmetic operation for acquiring the distance between the top car and the following car is performed and the acquired data is stored in the memory 54. The distance between both cars is obtained by detecting the blocks which are located between the cars, accumulating the distance for each block, acquiring the distances between the positions of the top and following cars in their blocks and the adjoining blocks in the progressing direction and adding the acquired distances to the accumulated distance. Those arithmetic operations are all performed by the CPU 50. It is then determined in step 43 if the distance between both cars is less than the set value Lg. When this distance is less than the set value Lg, the game should continue whereas when this distance is equal to or greater than the set value Lg, the game is over.

Steps 39 and 40 are the same as those in FIG. 3 which have been discussed earlier. It is however to be noted that the display information in step 40 includes the distance between the top car and the following car, not the time difference between both cars.

As the game can be over when the distance between the top car and the following car becomes equal to or greater than the preset distance Lg, it is unnecessary to monitor the timer associated with the check point which is performed in the flowchart in FIG. 3, thus reducing the amount of the required computation. Since game over can occur regardless of the check points, a more tense game can be provided.

Figure 8:
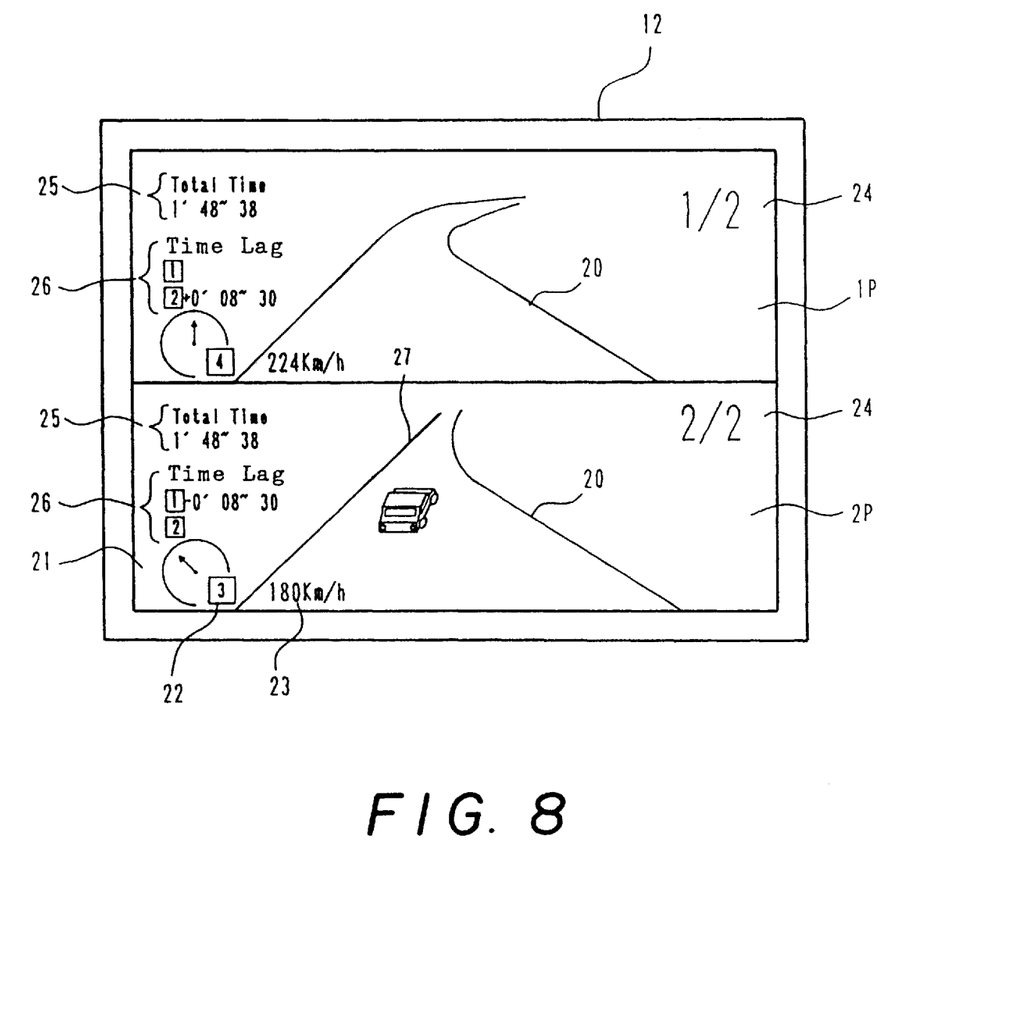
FIG. 8 is a diagram exemplifying a screen for the case where two players play a game.

FIG. 8 exemplifies the display screen when the above-described car race is played by two players. Like or same reference numerals are given to those parts in FIG. 8 which are the same as the corresponding parts in FIG. 1. The illustrated case shows the player 1P at the top and the player 2P following the player 1P at the bottom and shows different information on the position display 24, the timer display 26 at the check point CP and the like.

Although the game is over when the total game time passed exceeds the set time T2 in the above-described embodiment, this invention may also be adapted for the case where the restriction on the total game time is removed. In this case, the entertainment of the game unexpected from the conventional game can be provided by making the game over when the time difference or the distance between the top car and the following car exceeds the set time or the set distance.

This invention is also adaptable for the case where three or more players simultaneously play a car racing game. In this case, after the top car passes the check point CP, the associated timer starts measuring so that game over occurs for the last one of the cars following the top car which cannot pass the check point CP within the set time or whose distance to the top car becomes equal to or greater than the set distance, then the second last car experiences game over, and so forth.

According to this invention, as described above, a player does not compete the speed of finishing a course with the fixed start point and goal, but competes against the computer-controlled car or another player by whether the difference in the time at which the check point CP on the course is passed exceeds the set time, so that the player can experience a tense game from the beginning. If the set time is shortened, the game can be terminated in a short period of time. If the set time is made longer, on the other hand, the game can be transformed to one which demands the endurance of each player over a long period of time. If there is a significant difference between players' skills in playing the game, the proper handicap can be set by properly adjusting the length of the set time, so that a variety of players can enjoy playing the game.

As another game, a plurality of players compete against one another by whether the distances between the players on the course exceed the set distance through always monitoring the distances between the players, as opposed to the monitoring of the distance differences between the players at each of several check points CP provided along the course. The players can therefore experience more tense feeling. Depending on the course conditions, a new parameter may be added so that, for example, game over occurs on a concrete-pave straight portion, causing the players to experience more tense feeling.

The present examples and embodiment are to be considered as illustrative and not restrictive and the invention is not to be limited to the details given herein, but may be modified within the scope of the appended claims.

What we claim are:

1. A method of measuring a virtual time difference between mobile bodies in a racing game method which is performed by using a storage medium storing a racing game program, a game console for performing the racing game program, a display section for displaying game scenes based on image signals from the game console and an input operation section for allowing a player to perform input operations for at least acceleration, braking and manipulation of a steering wheel to the game console in association with the game scenes, the method comprising the steps of:

computing positions of first and second mobile bodies on a course defined within a predetermined coordinate space every predetermined sampling time;

detecting whether the first or second mobile body, whichever is leading, passes a predetermined point on the course from computed positional information of the first and second mobile bodies on the course;

detecting whether the following mobile body does not pass the predetermined point within a predetermined set time after the leading mobile body has passed the predetermined point, from the computed positional information; and indicating game over on a screen of the display section when it is detected that the following mobile body does not pass the predetermined point within the set time.

2. A method of measuring a virtual distance between mobile bodies in a racing game which is played by using a storage medium storing a racing game program, a game console for performing the racing game program, a display section for displaying game scenes based on image signals from the game console and an input operation section for allowing a player to perform input operations for at least acceleration, braking and manipulation of a steering wheel to the game player main body in association with the game scenes, the method comprising the steps of:

computing positions of first and second mobile bodies on a course defined within a predetermined coordinate space every predetermined sampling time;

computing a distance between the first and second mobile bodies on the course from computed positional information of the first and second mobile bodies on the course;

detecting whether the distance between the first and second mobile bodies on the course is equal to or greater than a predetermined set distance; and indicating game over on a screen of the display section when it is detected that the computed distance becomes equal to or greater than the predetermined set distance.

3. A method of measuring according to the claim 1 or 2 further comprising a step of counting a time passed since reception of a game start signal and indicating game over on the screen when the counted time passes a predetermined set time.

4. An apparatus for measuring a virtual time difference between mobile bodies for use in a game machine for performing a racing game program stored in a storage medium in accordance with a manipulation signal given by a player and supplying image or video signals to a display section for displaying game scenes, the measuring apparatus comprising:

computation means for computing positions of first and second mobile bodies on a course defined within a predetermined coordinate space every predetermined sampling time;

first detection means for detecting whether the first or second mobile body, whichever is leading, passes a predetermined point on the course from computed positional information of the first and second mobile bodies on the course;

second detection means for detecting whether the following mobile body does not pass the predetermined point within a predetermined set time after the leading mobile body has passed the predetermined point, from the computed positional information; and control means for supplying image signals to the display section for indicating game over on a screen of the display section when it is detected that the following mobile body does not pass the predetermined point within the set time.

5. An apparatus for measuring a virtual distance between mobile bodies for use in a game machine for performing a racing game program stored in a storage medium in accordance with a manipulation signal given by a player and supplying image signals to a display section for displaying game scenes, the measuring apparatus comprising:

first computation means for computing positions of first and second mobile bodies on a course defined within a predetermined coordinate space every predetermined sampling time;

second computation means for computing a distance between the first and second mobile bodies on the course from computed positional information of the first and second mobile bodies on the course;

detection means for detecting whether the distance between the first and second mobile bodies on the course is equal to or greater than a predetermined set distance; and control means for supplying image signals to the display section for indicating game over on a screen of the display section when it is detected that the computed distance becomes equal to or greater than the predetermined set distance.

6. An apparatus for measuring according to the claim 4 or 5: wherein the control means further comprise means for counting a time passed since reception of a game start signal and indicating game over on the screen when the counted time passes a predetermined set time.

7. A computer readable memory medium storing a race game program and connected to a game machine, said game machine executing the game program in accordance with a manipulation signal given by a player and providing with a image signal to a display for displaying a game image, said game program comprising:

- a program code for causing the game machine to compute positions of first and second mobile bodies on a course defined within a predetermined coordinate space every predetermined sampling time;
- a program code for causing the game machine to detect whether the first or second mobile body, whichever is leading, passes a predetermined point on the course from computed positional information of the first and second mobile bodies on the course;
- a program code for causing the game machine to detect whether the following mobile body does not pass the predetermined point within a predetermined set time after the leading mobile body has passed the predetermined point, from the computed positional information; and
- a program code for causing the game machine to indicate game over on the display when it is detected that the following mobile body does not pass the predetermined point within the set time.

8. A computer readable memory medium storing a race game program and connected to a game machine, said game machine executing the game program in accordance with a manipulation signal given by a player and providing with a image signal to a display for displaying a game image, said game program comprising:

- a program code for causing the game machine to compute positions of first and second mobile bodies on a course defined within a predetermined coordinate space every predetermined sampling time;
- a program code for causing the game machine to compute a distance between the first and second mobile bodies on the course from computed positional information of the first and second mobile bodies on the course;
- a program code for causing the game machine to detect whether the distance between the first and second mobile bodies on the course is equal to or greater than a predetermined set distance; and
- a program code for causing the game machine to indicate game over on the display when it is detected that the computed distance becomes equal to or greater than the predetermined set distance.

* * * * *